(12) United States Patent
Amir et al.

(10) Patent No.: US 12,520,310 B2
(45) Date of Patent: Jan. 6, 2026

(54) COMMUNICATION METHOD AND APPARATUS

(71) Applicant: Essence Security International (E.S.I.) Ltd., Herzliya Pituach (IL)

(72) Inventors: Ohad Amir, Herzlia Pituach (IL); Koby Ben Shloosh, Petah-Tikva (IL)

(73) Assignee: Essence Security International (E.S.I.) Ltd., Herzliya (IL)

( * ) Notice: Subject to any disclaimer, the term of this patent is extended or adjusted under 35 U.S.C. 154(b) by 733 days.

(21) Appl. No.: 17/638,626

(22) PCT Filed: Sep. 24, 2020

(86) PCT No.: PCT/IL2020/051044
§ 371 (c)(1),
(2) Date: Feb. 25, 2022

(87) PCT Pub. No.: WO2021/059276
PCT Pub. Date: Apr. 1, 2021

(65) Prior Publication Data
US 2022/0304025 A1    Sep. 22, 2022

(30) Foreign Application Priority Data
Sep. 27, 2019   (GB) ...................... 1913966

(51) Int. Cl.
*H04W 72/1273*   (2023.01)
*H04W 72/23*     (2023.01)

(52) U.S. Cl.
CPC ....... *H04W 72/1273* (2013.01); *H04W 72/23* (2023.01)

(58) Field of Classification Search
CPC ................. H04W 24/10; H04W 28/10; H04W 72/1273; H04W 72/23
See application file for complete search history.

(56) References Cited

U.S. PATENT DOCUMENTS 6,940,831 B1 *  9/2005  Omi ..................... H04W 72/543
                                              370/310.1
10,789,829 B2   9/2020  Amir et al.
(Continued)

FOREIGN PATENT DOCUMENTS

EP    1699028 A1    9/2006
EP    3145211 A1    3/2017
(Continued)

OTHER PUBLICATIONS

"International Application Serial No. PCT/IL2020/051044, International Search Report mailed Dec. 3, 2020", 3 pgs.
(Continued)

*Primary Examiner* — Michael Thier
*Assistant Examiner* — Prince A Mensah
(74) *Attorney, Agent, or Firm* — Schwegman Lundberg & Woessner, P.A.

(57) ABSTRACT

The disclosure relates to a system comprising a master device (110) configured for communication with a slave device (120). The master device (110) comprises processing circuitry (114) that includes a transceiver (112) and is configured to operate the transceiver at a bit rate selected from: a messaging bit rate and a data transfer bit rate. The processing circuitry (114) is configured to: operate the transceiver at the messaging bit rate for communication of messages; in response to being triggered for a data transfer, select at least one time slot in which to perform the data transfer, and operate the transceiver (112) to transmit to a first slave device (120 A) an instruction to operate at the data transfer bit rate in the selected at least one time slot; and operate at the data transfer bit rate in the selected at least one time slot to perform the data transfer.

15 Claims, 8 Drawing Sheets

(56) References Cited

U.S. PATENT DOCUMENTS

| | | | |
|---|---|---|---|
| 2005/0170776 A1 | 8/2005 | Siorpaes | |
| 2007/0188390 A1 | 8/2007 | Dunn et al. | |
| 2007/0249307 A1 | 10/2007 | Rybicki et al. | |
| 2010/0226317 A1* | 9/2010 | Horn | H04W 16/04 370/329 |
| 2011/0071815 A1 | 3/2011 | Bohizic et al. | |
| 2011/0281557 A1* | 11/2011 | Choi | H04L 63/0853 455/414.1 |
| 2012/0240010 A1* | 9/2012 | Wang | G06F 11/076 714/763 |
| 2014/0321532 A1* | 10/2014 | Ghat | H04N 19/124 375/240.03 |
| 2015/0207536 A1 | 7/2015 | Yehezkely et al. | |
| 2016/0105236 A1* | 4/2016 | Zhang | H04B 10/616 398/140 |
| 2016/0127972 A1 | 5/2016 | Ananthanarayanan et al. | |
| 2019/0014358 A1* | 1/2019 | Takabayashi | H04N 21/4621 |
| 2019/0207644 A1 | 7/2019 | Rasmussen | |

FOREIGN PATENT DOCUMENTS

| | | |
|---|---|---|
| EP | 3547553 | 10/2019 |
| WO | WO-0118997 A1 | 3/2001 |
| WO | 2017173235 | 10/2017 |
| WO | WO-2021059276 A1 | 4/2021 |

OTHER PUBLICATIONS

"International Application Serial No. PCT/IL2020/051044, International Written Opinion mailed Dec. 3, 2020", 8 pgs.

"IEEE Standard for Low-Rate Wireless Networks", IEEE Computer Society, Sponsored by the LAN MAN Standards Committee, IEEE Standards Association, IEEE Std 802.15.4-2015, (Dec. 5, 2015), 708 pgs.

"Application No. 19165835.0 European Search Report dated Jun. 27, 2019", 6 pages.

"App. No. GB1913966.6 Combined Search and Examination Report under Sections 17 and 18 3 mailed Mar. 18, 2020", 6 pages.

"GSM and DECT Emergency Call Box CTC-1016", Establishing a Multi-Person Communications System to Care for All, Vesta Family, Climax Technology, Brochure, Sep. 14, 2013., (Sep. 14, 2013), 1 pg.

"WTRVS Voice Reach Talking Pendant", Climax Technology "WTRVS—Voice Reach Talking Pendant", Climax Technology, Product News, Apr. 18, 2017., (Apr. 18, 2017), 1 pg.

"Voice Satellite CTC-808RV", Climax Technology "Voice Satellite CTC-808RV—Extending Protection Areas and Caring for Various Family Members Simultaneously", Climax Technology, Brochure, May 29, 2013., (May 29, 2013), 1 pg.

"Call Point CP-23", Climax Technology "Call Point CP-23-Help is Merely a Button Press Away!", Climax Technology, Brochure, Dec. 13, 2012, (Dec. 13, 2012), 1 pg.

Ida, Ichirou, "Realizing safe and reliable vital sings monitoring with wireless body area networks", 2013 IEEE Region 10 Humanitarian Technology Conference, (Aug. 2013), 6 pgs.

IEEE, "Part 15.4 Wireless Medium Access Control MAC and Physical Layer PHY Specifications for Low Rate Wireless Personal Area Networks WPANs", IEEE Computer Society, Sponsored by the LAN MAN Standards Committee, IEEE Standards Association, IEEE Std 802.15.4-2006, (Sep. 2006), 323 pages.

Yang, Wen-Bin, "Interference Mitigation for Body Area Networks", 2011 IEEE 22nd international symposium on personal, indoor and mobile radio communications, (Sep. 2011), 5 pages.

* cited by examiner

COMMUNICATION METHOD AND APPARATUS

RELATED APPLICATION/S

This application is a U.S. National Stage Application under 35 U.S.C. 371 from International Application No. PCT/IL2020/051044, filed 24 Sep. 2020, and published as WO2021/059276 on 1 Apr. 2021, which claims the benefit of priority of Great Britain Patent Application No. 1913966.6 filed on 27 Sep. 2019, the contents of which are incorporated herein by reference in their entirety.

TECHNICAL FIELD

The present invention relates to a device, system and method for communication between devices, for example between a master device and one or more slave devices.

BACKGROUND

It is known to provide communication between a first device that is configured to act as a master device, and further devices that are configured to act as slave devices. The master device may be configured to control the slave devices. For example, a home (or other premises) security system may comprise a control panel acting as a master device, and a plurality of peripheral devices acting as slave devices.

Communication between the master device and slave devices may be provided wirelessly, for example via radio-frequency signals.

The master device and slave devices may be configured to communicate via a protocol in which packets are sent between the master device and slave devices. Some packets may comprise messages, for example commands or alerts. Some packets may comprise a data payload, or a portion thereof, to be transferred between devices. For example, the data payload may comprise video data, audio data or a software update. Because of the relatively large size of such a data payload, such data transfer generally requires the use of multiple packets, and hence more time, to be communicated.

SUMMARY

In a first aspect of the invention, there is provided a master device configured for communication with at least one slave device. The master device comprises processing circuitry that includes a transceiver. The processing circuitry is configured to operate the transceiver at a bit rate selected from a group comprising: a messaging bit rate and a data transfer bit rate.

The processing circuitry is configured to: operate the transceiver at the messaging bit rate for communication of messages; in response to being triggered for a data transfer, select at least one time slot in which to perform the data transfer, select a data transfer bit rate for the data transfer, and operate the transceiver to transmit to a first slave device an instruction to operate at the selected data transfer bit rate in the selected at least one time slot. The processing circuitry is configured to operate at the selected data transfer bit rate in the selected at least one time slot to perform the data transfer with the first slave device.

Advantageously, significant costs may be saved by using a common transceiver for the data transfer and messages.

The selection of the data transfer bit rate requires a choice to be made from a number of possible data transfer bit rate options. Thus, the data transfer bit rate may be selected to be the same as or different from the messaging bit rate. One or more options may be available for selection of a different bit rate. In some embodiments, the chosen data transfer bit rate may be higher than the messaging bit rate. In some embodiments, the chosen data transfer bit rate may be less than the messaging bit rate.

A synchronous data transfer is performed between the master device and slave device by the use of allocated time slots used by both the master and the slave. By using a selectable bit rate for the data transfer, data may be transferred at a rate that is optimal (e.g. as high as possible, practical, or recommended) for the environmental conditions, which may result in the data being successfully transferred more efficiently. A data transfer bit rate used for data transfer may be higher than a messaging bit rate used for transmission of messages. Data transfers may be large. The use of a higher bit rate for data transfers may result in a significant reduction in time taken for the transfer.

The processing circuitry may be further configured to: in response to being triggered for a further data transfer with a second slave device, select a further at least one time slot in which to perform the further data transfer, the further at least one time slot being different to said at least one time slot: select a further bit rate for the further data transfer, and operate the transceiver to transmit to the second slave device an instruction to operate at the further bit rate in the further at least one time slot. The processing circuitry may be further configured to operate at the further bit rate in the further at least one time slot to perform the further data transfer.

The further bit rate for data transfer to the second slave device may be the same or different from the selected bit rate for data transfer with the first slave device. The use of synchronous communication including allocation of time slots may, amongst other benefits, be exploited to allow different bit rates to be used for communication with different slave devices. In any case, one or more time slots within a super frame having a plurality of time slots may be used for messaging at the messaging bit rate while another one or more of the time slots within the super frame may be used for data transfer at the data transfer bit rate.

The triggering for the data transfer may comprise receiving by the processing circuitry a request from the first slave device for a data transfer with the master device.

The triggering for the data transfer may comprise receiving by the processing circuitry an acknowledgement from the first slave device in response to a request by the master device for a data transfer with the first slave device.

The request to transfer data may comprise an indication of a data type of the data to be transferred. The data transfer bit rate may be selected in dependence on the data type being one of a set of a predetermined data types. The set of predetermined data types may comprise at least one of audio data, video data or software update.

The processing circuitry may be configured to select the data transfer bit rate in dependence on at least one signal parameter of a message received from or by the first slave device. The message may be a request to transfer data that is transmitted by the first slave device and received by the master device. The message may be an acknowledgment that is transmitted by the first slave device and received by the master device.

A value for the at least one signal parameter may be determined by the slave device and transmitted from the slave device to the master device. The value for the at least one signal parameter may be transmitted in an acknowledgment that is transmitted by the first slave device and received by the master device. The message from which the slave device determines the value for the at least one signal parameter may be a request to transfer data that is transmitted by the master device and received by the first slave device.

The processing circuitry may be configured to perform a handshaking procedure with the first slave device, thereby to obtain a value for the at least one signal parameter.

The at least one signal parameter may comprise at least one of a noise parameter, a signal to noise ratio (SNR) and a link quality indicator (LQI). In some embodiment, the at least one signal parameter more specifically comprises a link quality indicator (LQI).

The messaging bit rate may be a fixed bit rate. The messaging bit rate may be 38 Kbit/s.

The data transfer bit rate may be selected to be different to the messaging bit rate.

The data transfer bit rate may be selected, from a plurality of predefined possible bit rates. For example, the data transfer bit rate may be selected to be the same as the messaging bit rate. The data transfer bit rate can alternatively be selected to be different to the messaging bit rate. In some embodiments, the data transfer bit rate is also selectable to be lower than the messaging bit rate, which may be advantageous in a highly noisy environment. However, in some embodiments, the data transfer bit rate is additionally or alternatively selectable to be higher than the messaging bit rate. This is advantageous because it will often be beneficial to transfer the data at a highest bit rate that can be achieved. The processing circuitry may be configured to select the data transfer bit rate from a predefined plurality of bit rates. The plurality of bit rates may include 512 Kbit/s, 256 Kbit/s, 128 Kbit/s and 64 Kbit/s.

The processing circuitry may be configured to operate at the messaging bit rate when no data transfer is scheduled.

The data transfer request may be transmitted and received using the messaging bit rate. The instruction to the first slave device may be transmitted and received using the messaging bit rate.

Beacons may be transmitted, with a regular periodicity, from the master device to the at least one slave device, wherein the data transfer is by synchronous communication based on the beacons. In some embodiments, the instruction to the first slave device may be transmitted as part of a beacon of said beacons.

The master device may further comprise a single front end configured for communication at both the messaging bit rate and the data transfer bit rate. The master device may further comprise a single antenna configured for both the communication of messages and the data transfer.

In a second aspect of the invention, which may be provided independently, there is provided a slave device configured for communication with a master device. The slave device comprises processing circuitry that includes a transceiver. The processing circuitry is configured to operate the transceiver at a bit rate selected from a group comprising: a messaging bit rate and a data transfer bit rate.

The processing circuitry is configured to: operate the transceiver at the messaging bit rate for communication of messages; receive from the master device an instruction to operate at a selected data transfer bit rate in a selected at least one time slot; and operate at the selected data transfer bit rate in the selected at least one time slot to perform a data transfer.

The transceiver may be dormant in periods in which there is no communication of messages and no data transfer. The transceiver may periodically operate at the messaging bit rate, between periods of being dormant, to listen for beacons from the master device, wherein the instruction is received in a beacon.

The operation of the transceiver at the messaging bit rate may be in response to an instruction to listen for a message from the master, the instruction being received in a beacon, and/or in response to a determined need to transmit a message to the master.

The transceiver may be configured to operate at the messaging bit rate when listening for the beacons.

The processing circuitry may be further configured to operate the transceiver to transmit a data transfer request to the master device. The instruction to operate at a selected data transfer bit rate in a selected at least one time slot may be transmitted in response to the data transfer request.

The data transfer request may be transmitted during a contention access period following a beacon received from the master device.

The data transfer request may be transmitted asynchronously. If no acknowledgement of the data transfer request is received, the processing circuitry may be configured to operate the transceiver to transmit a further data transfer request during a contention access period following a beacon received from the master device.

The data transfer request may comprise an indication of a data type of the data to be transferred. The data type may comprise at least one of audio data, video data or software update.

The slave device may be configured to determine a value for a signal parameter of a message received from the master device. The message received from the master device may be a data transfer request. The slave device may be configured to transmit the value for the signal parameter to the master device, optionally in an acknowledgment transmitted in response to the data transfer request. The at least one signal parameter may comprise at least one of a noise parameter, a signal to noise ratio (SNR) and a link quality indicator (LQI).

The data transfer bit rate may be selected to be different from the messaging bit rate. Further, the messaging bit rate may be a fixed bit rate. In any case the data transfer bit rate is in some embodiments higher than the messaging bit rate. The processing circuitry of the slave device may be configured to operate at the messaging bit rate when no data transfer is scheduled and there is no data transfer in progress. The processing circuitry of the slave device may be configured to operate in a sleep mode by default. The processing circuitry of the slave device may be configured to wake up for a listening window to listen for beacons from the master device. The listening window may have a regular periodicity wherein the slave device defaults to the sleep mode in-between listening windows. The instruction to the slave device may be transmitted as part of a beacon for synchronous communication.

The slave device may further comprise a single front end configured for communication at both the messaging bit rate and the data transfer bit rate. The slave device may further comprise a single antenna configured for communication at both the messaging bit rate and the data transfer bit rate.

In a third aspect of the invention, which may be provided independently, there is provided a system comprising a master device and at least one slave device. Each of the devices comprises respective processing circuitry that includes a respective transceiver. The processing circuitry is configured to operate the transceiver at a bit rate selected from a group comprising: a messaging bit rate and a data transfer bit rate. The processing circuitry of each device is configured to operate the respective transceiver at the messaging bit rate for communication of messages. The processing circuitry of the master device is configured to, in response to being triggered for a data transfer, select at least one time slot in which to perform the data transfer, select a data transfer bit rate for the data transfer, and operate the transceiver to transmit to a said slave device an instruction to operate at the selected data transfer bit rate in the selected at least one time slot; and operate at the selected data transfer bit rate in the selected at least one time slot to perform the data transfer. The processing circuitry of the said slave device is configured to receive from the master device the instruction to operate the transceiver at the selected data transfer bit rate in the selected at least one time slot; and operate at the selected data transfer bit rate in the selected at least one time slot to perform the data transfer.

In a fourth aspect of the invention, which may be provided independently, there is provided a method comprising: operating a transceiver of a master device at a messaging bit rate for communication of messages, wherein processing circuitry includes the transceiver, and the processing circuitry is configured to operate the transceiver at a bit rate selected from a group comprising: a messaging bit rate and a data transfer bit rate; in response to being triggered for a data transfer, selecting by the processing circuitry at least one time slot in which to perform the data transfer, selecting by the processing circuitry a data transfer bit rate for the data transfer, and operating the transceiver to transmit to a first slave device an instruction to operate at the selected data transfer bit rate in the selected at least one time slot; and operating the processing circuitry at the selected data transfer bit rate in the selected at least one time slot to perform the data transfer with the first slave device.

In a fifth aspect of the invention, which may be provided independently, there is provided a method comprising: operating processing circuitry of a slave device at a messaging bit rate for communication of messages, wherein the processing circuitry includes a transceiver, and the processing circuitry is configured to operate the transceiver at a bit rate selected from a group comprising: a messaging bit rate and a data transfer bit rate; receiving, by the processing circuitry and from a master device, an instruction to operate at a selected data transfer bit rate in a selected at least one time slot; and operating the processing circuitry at the selected data transfer bit rate in the selected at least one time slot to perform a data transfer.

In a sixth aspect of the invention, which may be provided independently, there is provided a method comprising: operating processing circuitry of a master device at a messaging bit rate for communication of messages, wherein the processing circuitry includes a transceiver, and the processing circuitry is configured to operate the transceiver at a bit rate selected from a group comprising: a messaging bit rate and a data transfer bit rate; operating a transceiver of a slave device at the messaging bit rate for communication of messages, wherein the processing circuitry includes the transceiver and the processing circuitry is configured to operate the transceiver at a bit rate selected from a group comprising: a messaging bit rate and a data transfer bit rate; in response to being triggered for a data transfer, selecting by the processing circuitry of the master device at least one time slot in which to perform the data transfer, selecting by the processing circuitry of the master device a data transfer bit rate for the data transfer, and operating the transceiver of the master device to transmit to a first slave device an instruction to operate at the selected data transfer bit rate in the selected at least one time slot; receiving, by the processing circuitry of the slave device the instruction; and operating the processing circuitry of the master device and the processing circuitry of the slave device at the selected data transfer bit rate in the selected at least one time slot to perform the data transfer.

There may be provided one or more computer-readable mediums comprising instructions which, when executed by one or more processing systems, cause the computer to perform a method as claimed or described herein.

In a seventh aspect of the invention, which may be provided independently, there is provided a master device configured for communication with at least one slave device, the master device comprising processing circuitry that includes a transceiver, the processing circuitry configured to operate the transceiver at a bit rate selected from a group comprising: a messaging bit rate and a data transfer bit rate; wherein the processing circuitry is configured to: operate the transceiver at the messaging bit rate for communication of messages; in response to being triggered for a data transfer, select at least one time slot in which to perform the data transfer, and operate the transceiver to transmit to a first slave device an instruction to operate at the data transfer bit rate in the selected at least one time slot; and operate at the data transfer bit rate in the selected at least one time slot to perform the data transfer.

In an eighth aspect of the invention, which may be provided independently, there is provided a slave device configured for communication with a master device, the slave device comprising processing circuitry that includes a transceiver, the processing circuitry configured to operate the transceiver at a bit rate selected from a group comprising: a messaging bit rate and a data transfer bit rate; wherein the processing circuitry is configured to: operate the transceiver at the messaging bit rate for communication of messages; receive from the master device an instruction to operate at the data transfer bit rate in a selected at least one time slot; and operate at the data transfer bit rate in the selected at least one time slot to perform a data transfer.

Features in one aspect may be applied as features in any other aspect, in any appropriate combination. For example, method features may be provided as device features or vice versa.

Further, embodiments of first and second aspects of the invention are also applicable to seventh and eighth aspects of the invention, respectively.

In some embodiments, the master is a control panel of a security and/or safety system and slave device(s) are peripherals of the system.

BRIEF DESCRIPTION OF THE SEVERAL
VIEWS OF THE DRAWINGS

Embodiments will now be described by way of example only, and with reference to the accompanying drawings, of which:

DETAILED DESCRIPTION

As used herein, except where the context requires otherwise, the terms "comprises", "includes", "has", and grammatical variants of these terms, are not intended to be exhaustive. They are intended to allow for the possibility of further additives, components, integers or steps.

Figure 1:
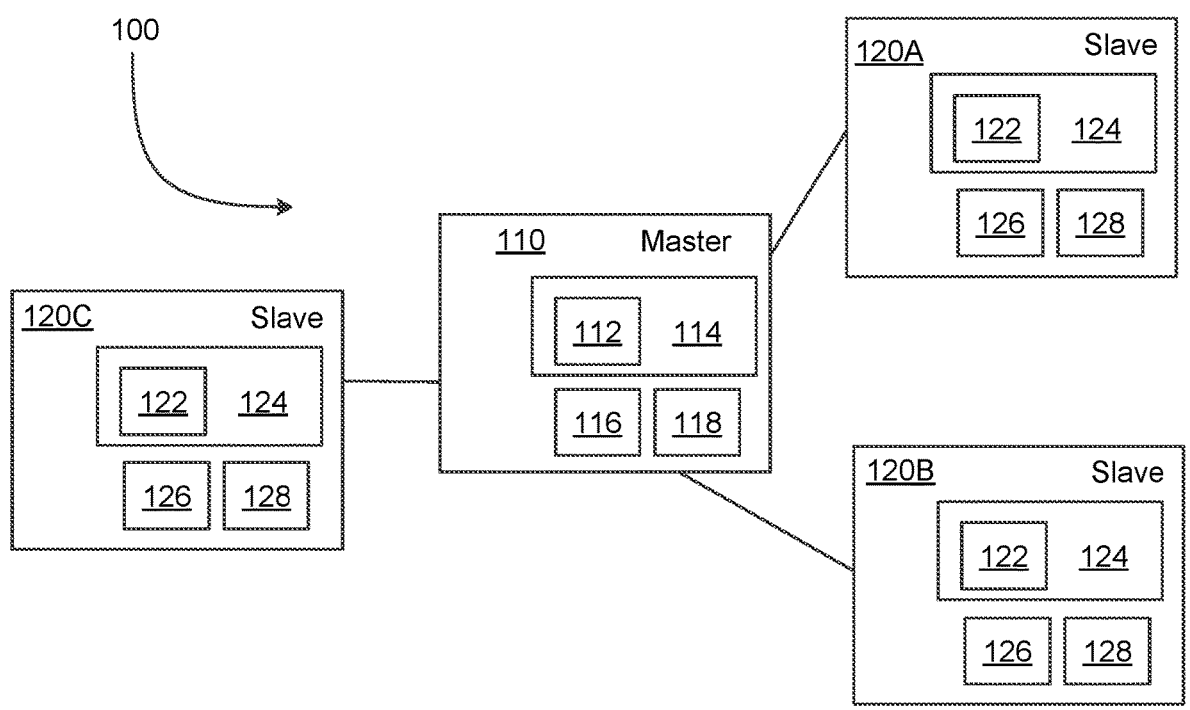
FIG. 1 is a schematic illustration of a system comprising a master device and three slave devices.

FIG. 1 is a schematic diagram of a system 100 in accordance with an embodiment. The system 100 comprises a master device 110 and a plurality of slave devices 120. In the embodiment shown in FIG. 1 there are three slave devices 120A, 120B, 120C illustrated. Other embodiments of the system 100 may have any suitable number of master devices 110 and associated slave devices 120.

The master device 110 is configured to communicate with the slave devices 120 via wireless communication. The slave devices 120 are each configured to communicate with the master device 110 via wireless communication.

The master device 110 may also be configured for communication with a further device (not shown), for example a remote server and/or monitoring station.

The master device 110 comprises processing circuitry 114 comprising a transceiver 112 for transmitting and/or receiving communications. The transceiver 112 may be integrated into a common chip with a processor of the processing circuitry 114. The processor and transceiver may share common processing circuitry and/or other resources. Alternatively parts of the processing circuitry that are distinct from the transceiver may be provided by one or more processing chips that are distinct from a transceiver processing chip. A memory, which may comprise a non-transient memory, may store instructions for configuring the processor to perform its processing functions. Alternatively, the processing circuitry may be preconfigured for its functions, e.g. by being an ASIC chip.

The master device 110 further comprises an RF front end 116 and an antenna 118. In use, the processing circuitry 114 operates the transceiver 112 to transmit and receive communications via the RF front end 116 and antenna 118.

By using the same RF front ends and/or antennas for both messages and data transfers costs may be saved in comparison with using different RF front ends and/or antennas.

Each slave device 120 comprises respective processing circuitry 124 comprising a respective transceiver 122. Each slave device 120 further comprises a respective RF front end 126 and antenna 128. In use, the processing circuitry 124 operates the transceiver 122 to transmit and receive communications via the RF front end 126 and antenna 128.

The slave device 120 operates in a sleep mode by default, for power saving. The slave device 120 may be battery operated and it may be desirable to conserve battery power. The slave device 120 wakes up to listen for beacons from the master device 110. The slave device 120 also wakes up when instructed, in a beacon, to do so by the master device 110.

The slave device 120 may also wake up under additional conditions, e.g. in response to condition that is based on a sensor of, or that that communicates to, the slave device.

By default, the master device 110 operates in a mode in which it listens for communications at a fixed bit rate which may also be referred to as a messaging bit rate. The messaging bit rate may be, as an example only, 38 Kbit/s. However, as will be appreciated by the person skilled in the art other values may be used. The slave device 120 may be configured so that, when awake, the slave device 120 also listens for communications at the fixed bit rate, unless instructed to do otherwise.

Communications between the master device and slave devices may comprise the following four types of communications: messages, beacons, acknowledgements (ACKs) and data.

In the present embodiment, messages are short communications which are capable of being transmitted in a single packet. For example, in some embodiments a "message" may be characterised as a communication consisting of a single packet having a size of 128 bytes or less. Thus in some embodiments, a communication of "data" or a "data transfer", as referred to herein, is any communication involving more than one packet and/or a packet larger than 128 bytes. The term "packet", in such embodiments, is a MAC frame. In other embodiments, the 128 byte distinction between messages and data may be in reference to the size of a PHY frame. It is advantageous for a maximum size of a packet used for messaging to be relatively small in order to conserve battery power.

In the present embodiment, messages include alerts, status information, and keypad messages from the slave device 120 to the master device 110. An example of a message from the master device 110 to the slave device 120 is a command, which is a message instructing the receiving device to perform an action. A command sent from the master device 110 to a slave device 120 must be obeyed by the slave device 120. Since the slave does not have control of the master, the term "command" is not used in the examples herein to describe any messages from the slave to the master.

An alert is an indication of an event or condition. For example, if the slave devices 120 are sensor devices, the alert may be an indication that a sensor has been triggered. For example, the sensor may be triggered by a threshold condition being exceeded. Each slave device may, for example, comprise one or more of a passive infrared sensor, a camera, a microphone, a panic button, a smoke sensor, and/or any other sensors that may be used for security and/or safety monitoring. The slave device 120 may use an alert to report to the master device 110 that its sensor has been triggered. Status information may be any information relating to the status of the slave device 120. Examples include: a detection event based on a sensor, a tamper event, a low battery condition, a "video ready" notification, a remote software update successful notification, a pairing request, a system status request, and a supervision message (e.g., a keep alive message). Keypad messages may be indicative of information that has been input into a keypad and may include, for example, an entered pin code, an arm request and a disarm request.

Beacons may be used as communications transmitted by the master device 110 to synchronize communication between the master device 110 and slave devices 120. A beacon is transmitted at the start of a time period which may be called a super frame. In the present embodiment, a beacon includes an allocation of any time slots in which the slave devices 120 are to transmit or receive. The beacon may also include an indication of a bit rate to be used for each time slot. Beacons are described further below with reference to FIGS. 3 to 8.

ACKs are short communications which may be sent in response to receipt of another communication, for example in response to a received message or in response to a received data communication or part thereof.

Data communications are typically larger communications (compared with message communications) for carrying data payloads. For example, packets above 128 bytes may be considered to be data. Communications having payloads that are communicated over multiple time slots and/or multiple packets may be considered to be data communications.

The data that is transferred using data communications may comprise, for example, audio data, video data or software update. An audio or video recording may be sent from a slave device 120 to the master device 110. A software update may be sent from the master device 110 to a slave device 120.

Each device may store data to be transmitted in memory, for example in non-transitory memory. It may be that transmission of the data by a device is significantly later than the time at which the device acquired the data.

The master device 110 may be configured to send data to and/or receive data from a further device, for example a server and/or remote monitoring station.

Figure 2:
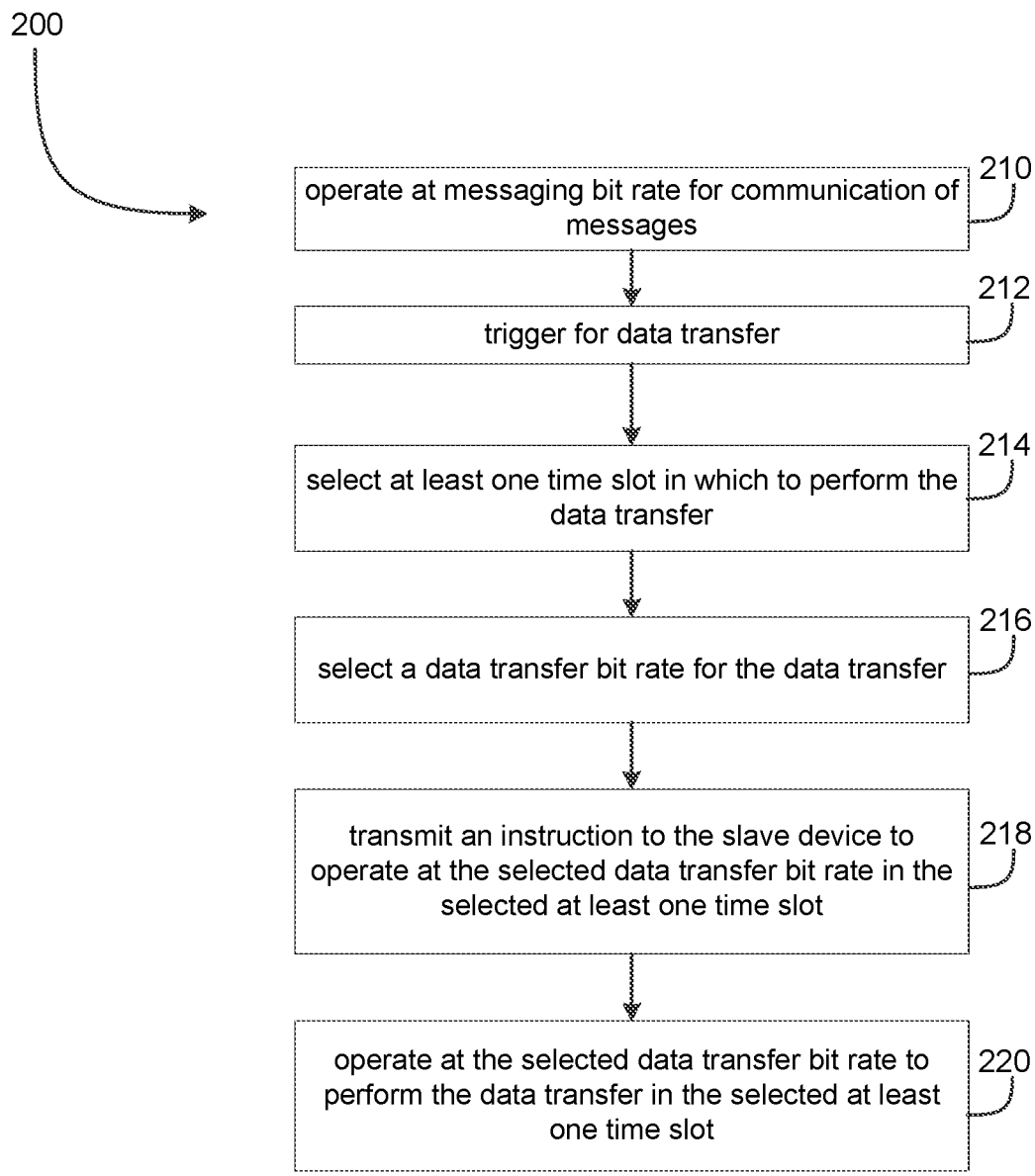
FIG. 2 is a flow chart illustrating in overview a method of an embodiment.

FIG. 2 is a flow chart illustrating in overview a data transfer from a master device 110 to a slave device 120 according to an embodiment.

At stage 210, the processing circuitry 114 of the master device 110 operates at a messaging bit rate for communication of messages. For the purpose of understanding the examples disclosed herein, the messaging bit rate may be taken as 38 Kbit/s, although other values may be used.

At stage 212, the processing circuitry 114 is triggered for a data transfer. The trigger for the data transfer may be the receiving of a data transfer request from the slave device 120. Alternatively, the trigger for the data transfer may be the receiving of an acknowledgement from the slave device 120 after a data transfer request has been sent by the master device 110.

At stage 214, the processing circuitry 114 selects at least one time slot in which to perform the data transfer. At stage 216, the processing circuitry 144 selects a data transfer bit rate for the data transfer. As described further below, the data transfer bit rate may be selected based on a signal parameter of a communication between the master device 110 and slave device 120, for example a Link Quality Indicator (LQI). The data transfer bit rate may, in some embodiments, be selected based on a data type of the data to be transferred. The data type may be specified in the data transfer request. Stages 214 and 216 may be performed simultaneously or in either order.

At stage 218, the processing circuitry 114 operates the transceiver 112 to transmit to the slave device 120 an instruction to operate at the selected data transfer bit rate in the selected at least one time slot. The slave device 120 listens at the selected data transfer bit rate in the selected at least one time slot. At stage 220, the processing circuitry 114 operates at the selected data transfer bit rate in the selected at least one time slot to perform the data transfer (whether it be receiving or transmitting the transfer) with the slave device 120.

The master device 110 is also configured to perform further data transfers with the same slave device 120 and optionally with other slave devices 120. Different data transfer bit rates may be used for different data transfers. Each of the data transfer bit rates may be different from the messaging bit rate used for transmission of messages.

Figure 3:
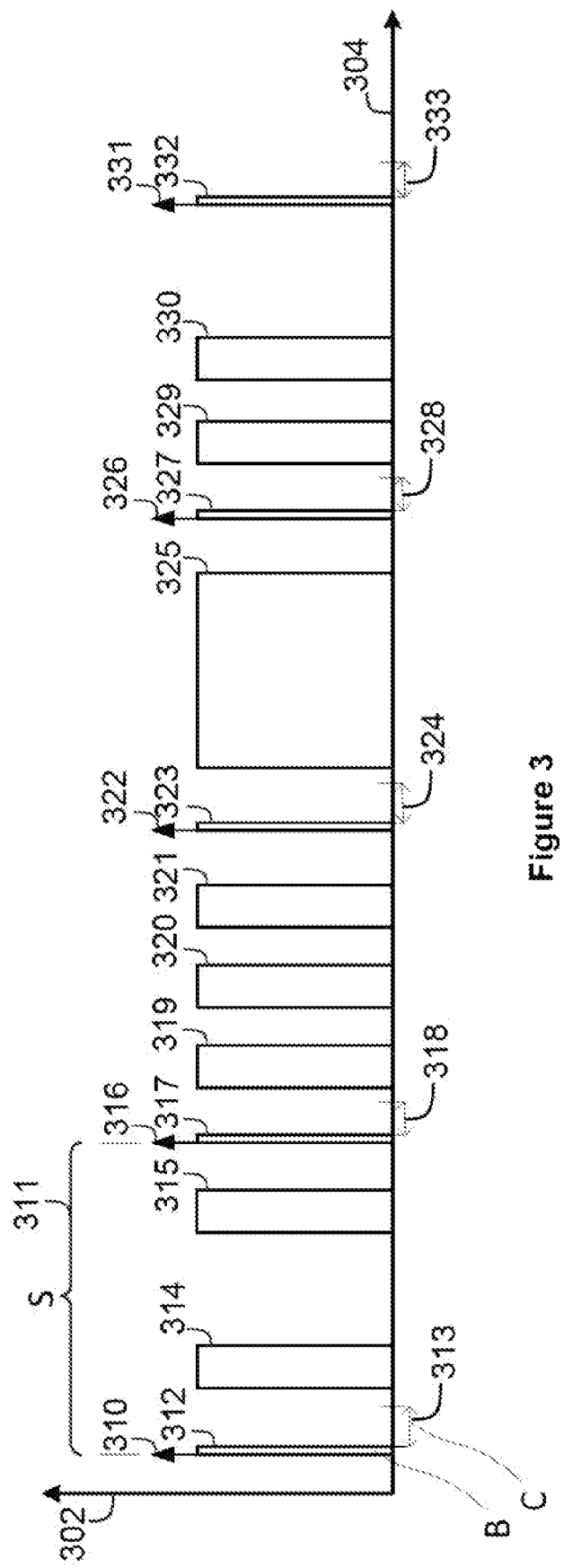
FIG. 3 is a timing diagram illustrating communications between a master device and a plurality of slave devices.

FIG. 3 is a timing diagram, according to an embodiment, which schematically illustrates communications between the master device 110 and slave devices 120A, 120B and 120C of FIG. 1. Time is illustrated from left to right on a horizontal axis 304. A vertical axis 302 is used to illustrate whether or not a transmission is occurring at any given time. Periods allocated for transmissions are illustrated by bars distributed along the time axis 304.

For simplicity, only beacons, message communications from the master to the slave, and data communications (from or to the master) are illustrated in FIG. 3. Any messages from a slave to the master for requesting a time slot to transmit a data communication are not illustrated in FIG. 3. ACKs to message/data communications are not illustrated in FIG. 3, since ACKs if used may be done so in any known way. However, in some embodiments ACKs may exist within an illustrated period allocated for transmission. FIGS. 4 to 8 show more detailed exchange of communications, including messages for requesting a data transfer, and ACKs.

A first time is indicated by arrow 310. The first time 310 may be considered to be the start of a super frame 311 having length (i.e. duration) S.

Starting at the first time 310, the processing circuitry 114 of the master device 110 operates the transceiver 112 of the master device to transmit a beacon 312 having duration B. The beacon is transmitted at a first bit rate. The first bit rate is used for communication of messages, and may be referred to as a messaging bit rate. The first bit rate may therefore be fixed (e.g. 38 Kbit/s).

The slave devices 120 wake up to listen for the beacon 312. The slave devices 120 listen using the first bit rate.

In the beacon 312, a first time slot is allocated to a first slave device 120A to transmit data. A selected bit rate (e.g. 512 Kbit/s) is allocated to the first time slot. A second time slot with a selected bit rate (e.g. 512 Kbit/s) is allocated to a second slave device. The bit rate allocated to the first time slot and second time slot is higher than the first bit rate. In other embodiments, the bit rates allocated to the first time slot and the second time slot may be different to each other.

The bit rate for the first and second time slots 314 and 315 that follow the beacon 312 may be selected by processing circuitry 114 of the master device, for example using a method as described below with reference to FIGS. 7 and 8. The bit rate for the first and second time slot of this example may be referred to as a data transfer bit rate, since they are used for data transfer communications. Also for simplicity of the description herein, although time slots 314 and 315 are referred to as first and second time slots, they may more specifically be first and second allocated time slots. For example, there may be other time slots defined by the communication protocol but which remain allocated in that super frame, and which may exist between the first and second allocated time slots 314 and 315. The allocated time slots may be thus selected from a plurality of time slots that have predefined locations within each super frame, as defined by the protocol.

Following the beacon is a contention access period (CAP) 313 of duration C. In the CAP, slave devices 120 may send messages to the master device 110. Such messages are not shown in FIG. 3. During the CAP 313, the master device 110 listens for requests from the slave devices 120 to transmit data, and for any other messages transmitted by the slave devices 120. In the super frame that follows a super frame that had a CAP in which such a request was received, one or more respective time slots are allocated to the slave(s) that requested communication.

The first and second time slots follow the CAP 313 and fall within the first super frame 311. In each of the first and second time slots, the master device 110 listens at the data transfer bit rate of 512 Kbit/s. In the first time slot, the processing circuitry 124 of the first slave device 120A operates the transceiver 122 of the first slave device 120A at 512 Kbit/s to perform a data transmission 314. In the second time slot, the processing circuitry 124 of the second slave device 120B operates the transceiver 122 of the second slave device 120B at 512 Kbit/s to perform a data transmission 315.

A similar process is followed for subsequent super frames. Arrow 316 indicates the start of a second super frame. The processing circuitry 114 of the master device 110 operates the transceiver to send a beacon 317. The beacon 317 allocates three corresponding time slots 319, 320, 321 to the first slave device 120A, a third slave device 120C, and the second slave device 120B respectively. In this example, different bit rates are selected for the different time slots. The bit rate for the first time slot is 512 Kbit/s. The bit rate for the second time slot is 256 Kbit/s. The bit rates for the first and second time slots may be referred to as data transfer bit rates. The bit rate for the third time slot is 38 Kbit/s, which is the messaging bit rate. Time slots 319, 320, 321 are illustrated with gaps between them. However, in other embodiments there need not be gaps. However, in any case, the master is in some embodiments configured to listen at the messaging bit rate during any times in which there are no time slots allocated for data transfer, which can therefore include any time periods between allocated time slots.

The three time slots follow a CAP 318. In the first time slot, the processing circuitry 124 of the first slave device 120A operates the transceiver 122 of the first slave device 120A at 512 Kbit/s to perform a data transmission 319 to the master device 110. In the second time slot, the processing circuitry 114 of the master device 110 operates the transceiver 112 of the master device 110 at 256 Kbit/s to perform a data transmission 320 to the third slave device 120C. The third slave device 120C listens at 256 Kbit/s during the second time slot, and receives the data transmission 320 from the master 110. In the third time slot, the processing circuitry 124 of the second slave device 120B operates the transceiver 122 of the second slave device 120B at 38 Kbit/s to receive a message 321 transmitted from the master 110.

Arrow 322 indicates the start of a third super frame. The processing circuitry 114 of the master device 110 operates the transceiver to send a beacon 323. The beacon 323 allocates a plurality of time slots (shown collectively by block 325) to the second slave device 120B. These time slots have a bit rate of 256 Kbit/s, for example.

The time slots follow a CAP 324. In the time slots, the processing circuitry 124 of the second slave device 120B operates the transceiver 122 of the second slave device 120B to transmit a first portion 325 of data at 256 Kbit/s. In this example, the data to be sent by the second slave device 120B is too long to be transmitted in a single super frame. Therefore, transmission of the data is split over successive super frames.

Arrow 326 indicates the start of a fourth super frame. The processing circuitry 114 of the master device 110 operates the transceiver to send a beacon 327. The beacon 327 allocates, in this example, a first time slot to the second slave device 120B at 512 Kbit/s and a second time slot to the first slave device 120A at 38 Kbit/s, the latter being equal to the messaging bit rate.

The first and second time slots follow a CAP 328. In the first time slot, the processing circuitry 124 of the second slave device 120B operates the transceiver 122 of the second slave device 120B to transmit a second portion 329 of data at a selected bit rate of 256 Kbit/s, in this example. It could alternatively have been configured to use the same bit rate as used for the first time slot (512 Kbit/s, in this example). The transmission of the second portion 329 of data completes the data transfer that was started by transmission of the first portion 325 of data.

In the second timeslot, the first slave device 120A listens at the messaging bit rate. The processing circuitry 114 of the master device 110 operates the transceiver 112 of the master device 110 to transmit a message 330 to the first slave device 120 at 38 Kbit/s. The message 330 is received by the first slave device.

Arrow 331 indicates the start of a fifth super frame, starting with a beacon 332 followed by a CAP 333.

FIG. 3 shows only an example of a small set of communications. The set of communications illustrated in FIG. 3 may be followed by or supplemented with any other suitable communications. Communication between the master device 110 and slave devices 120A, 120B, 120C may occur in any suitable order and at any suitable selected bit rates.

It may be seen from FIG. 3 that time slots respectively allocated in respect of different slave devices 120 may have different bit rates to each other. Different slave devices 120 may transmit using different data transfer bit rates during the same super frame. Further, one or more slave devices 120 may transmit at a data transfer bit rate and one or more other slave devices 110 may transmit at a messaging bit rate during the same super frame.

FIGS. 4 to 8 are swim lane diagrams showing communications between a master device 110 and slave device 120, which may be any one of the slave devices 120A, 120B or 120C in the system 100. In these examples, at least the data transfer aspect of the communication between the master device 110 and slave device 120 is based on a synchronous protocol.

In the description of FIGS. 4 to 8, we will refer to communications being transmitted and received by the master device 110 and slave device 120. In some embodiments, the sending of each communication comprises operating, by the processing circuitry of the transmitting device, the transceiver of the transmitting device to send the communication via the front end and antenna of the transmitting device. The receiving of each communication comprises receiving the communication by the transceiver of the receiving device via the antenna and front end of the receiving device, and processing, by the processing circuitry, signals received by the transceiver.

Figure 4:
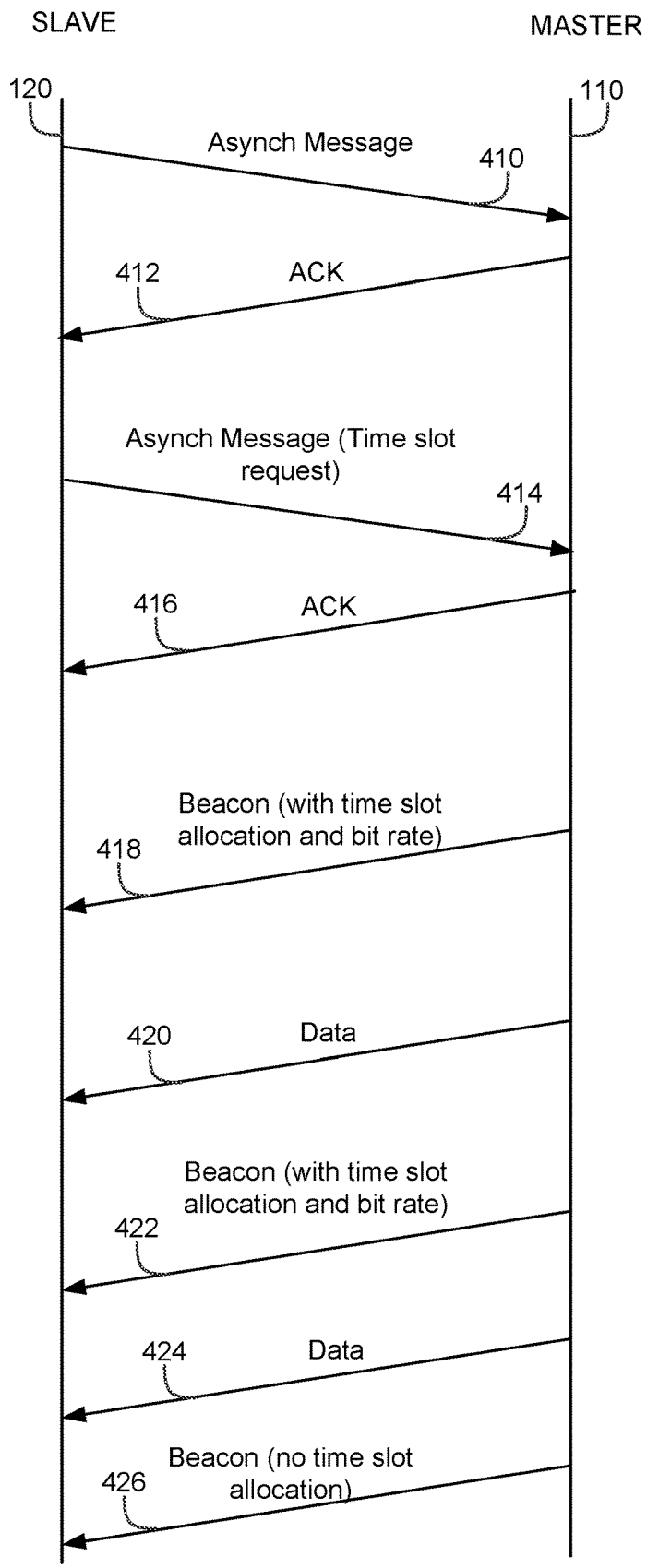
FIG. 4 is a swim lane diagram illustrating a data transfer from a master device to a slave device in accordance with an embodiment.

In the example of FIG. 4, both the master device 110 and the slave device 120 initially operate at a messaging bit rate, for example 38 Kbit/s. It may be considered that the master device 110 and slave device 120 are initially operating in a messaging mode.

The slave device 120 sends a message 410 to the master device 110 using the messaging bit rate. The message 410 is sent asynchronously, rather than being sent in a time slot that has been allocated by the master device 110. By default, the master device 110 is listening at the messaging bit rate. Therefore, slave devices 120 can assume that the master device 110 is listening, and transmit a message asynchronously without waiting for CAP period that follows a next beacon.

The asynchronous message 410 is received by the master device 110. The master device 110 transmits an acknowledgement, ACK 412, at a bit rate that is the same as the messaging bit rate. The slave device 120 receives the acknowledgement 412. The message 410 may for example be to notify the master that detection event has been identified by the slave 120.

The slave device 120 then sends a further message 414 to the master device 110 asynchronously, at the messaging bit rate. The further message 414 comprises a request for a time slot in which the slave device 120 will receive a data transfer from the master device 110. The request includes a type field which defines that there is a data request. The request also includes information about the type of data being requested for the communication, for example video, audio or software.

The master device 110 receives the further message 414. The master device 110 transmits an acknowledgement, ACK 416, at a bit rate that is the same as the messaging bit rate. The ACK 416 is received by the slave device 120.

At the start of a subsequent (e.g. next) super frame, the master device 110 transmits a beacon 418 at a bit rate that is the same as the messaging bit rate. The beacon 418 comprises an allocation of a first time slot for data transfer to the slave device 120. The beacon 418 also comprises an indication of a data transfer bit rate to be used for the data transfer in the first time slot. The data transfer bit rate may be selected by the master device 110 in accordance with a method described below with reference to FIGS. 7 and 8.

The beacon 418 may include an instruction to the slave device 120 to listen at the data transfer bit rate during the first time slot.

At the first time slot, the processing circuitry 124 of the slave device 120 switches from operating at the messaging bit rate to operating at the selected data transfer rate. The processing circuitry 124 of the slave device 120 may switch from a messaging mode in which it operates at the messaging bit rate to a data transfer mode in which it operates at the data transfer bit rate that was indicated in the beacon 418. For example, a different MAC frame structure may be employed for messages and data, respectively. At the allocated time slot, the slave device 120 starts listening at the data transfer bit rate that was indicated in the beacon 418.

At a first time slot, the processing circuitry 114 of the master device 110 switches from operating at the messaging bit rate to operating at the selected data transfer bit rate. It may be considered that the processing circuitry 114 of the master device 120 switches from a messaging mode to a data transfer mode. The master device 110 transmits data 420 of the data transfer at the selected data transfer bit rate. The data 420 may comprise a single packet or multiple packets.

The slave device 120 may send an acknowledgement (not shown) of each data packet. The acknowledgement may be sent at the data transfer bit rate. Acknowledgements of data packets are not shown in FIGS. 4 to 8 for simplicity, but may be present for any data transfer shown in FIGS. 4 to 8.

After the first time slot, the processing circuitry 114 of the master device 110 reverts to operating at the messaging bit rate. The slave device 120 may go into a sleep mode until it needs to listen for the next beacon at which time it will operate at the messaging bit rate.

In the example of FIG. 4, the first time slot is not long enough for the data transfer to be completed.

Therefore, at the start of the next super frame, the master device 110 transmits a beacon 422. The beacon 422 is transmitted at the same bit rate as the messaging bit rate. The beacon 422 comprises an allocation of a second time slot for data transfer to the slave device 120. The beacon 418 also comprises an indication of a data transfer bit rate to be used for the data transfer in the second time slot. The master device 110 may select a data transfer bit rate for the second time slot that is the same as or different from the data transfer bit rate used for the first time slot.

At the second time slot, the processing circuitry 124 of the slave device 120 operates at the selected data transfer bit rate that was indicated in the beacon 422 to listen for more data. The processing circuitry 114 of the master device 110 switches from the messaging bit rate to the data transfer bit rate. The master device 110 transmits data 424 of the data transfer at the indicated data transfer bit rate. This completes the data transfer.

At the next beacon 426, the master device 110 does not allocate any time slot for transmission to the slave device 120, because no data transmission to the slave device is needed.

Figure 5:
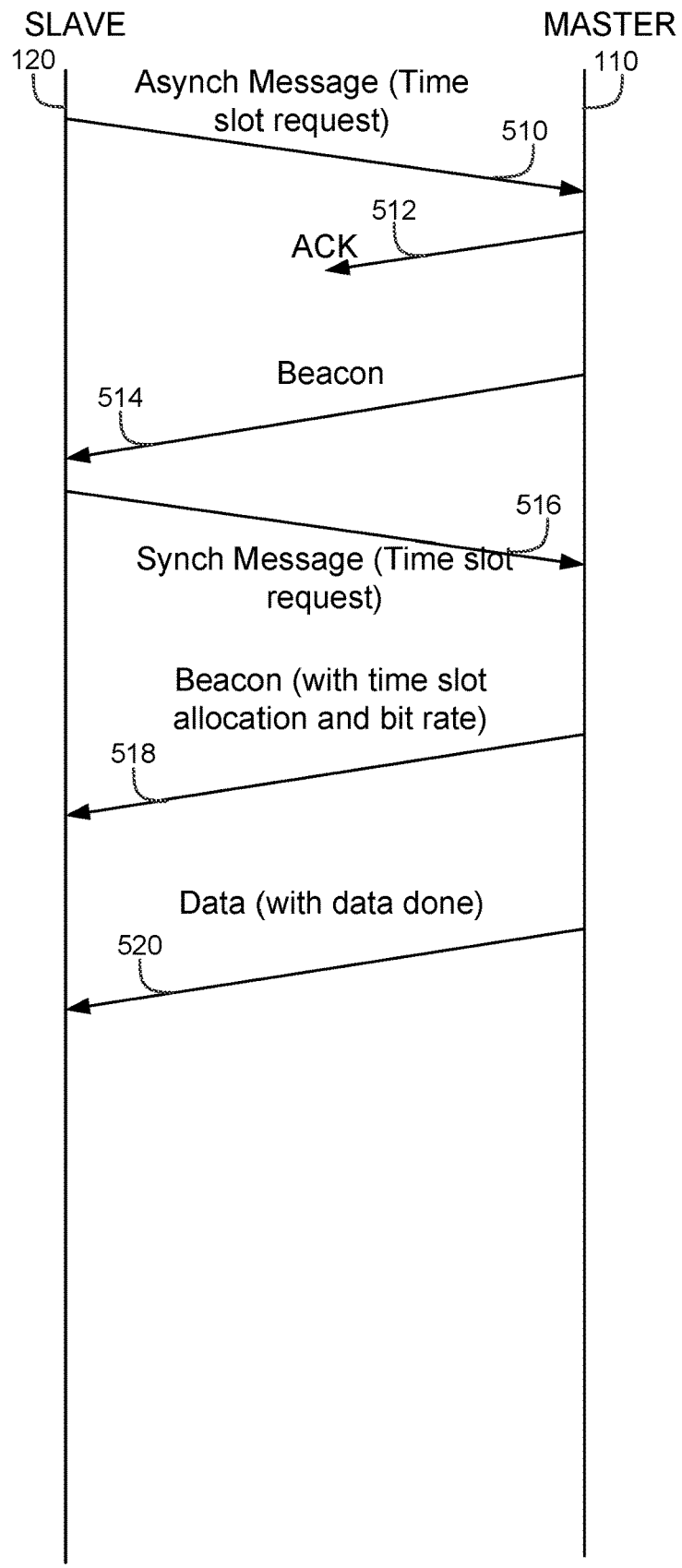
FIG. 5 is a swim lane diagram illustrating a data transfer from a master device to a slave device in accordance with an embodiment.

Turning now to the example of FIG. 5, both the master device 110 and the slave device 120 initially operate at a messaging bit rate, for example 38 Kbit/s.

In particular, the slave device 120 sends a message 510 to the master device 110 using the messaging bit rate. The message 510 is sent asynchronously. The asynchronous message 510 is received by the master device 110. The master device 110 transmits an acknowledgement, ACK 512, at a bit rate that is the same as the messaging bit rate. In this example, the slave device 120 does not receive the ACK 512 before the next beacon 514.

The master device 110 sends the beacon 514 at a bit rate that is the same as the messaging bit rate. Since no ACK was received in response to the request for a time slot (message 510), The slave device 120 uses the contention access period to send another message 516 requesting a time slot for data transfer. The message is sent at the messaging bit rate. The master device 110 listens at the messaging bit rate during the contention access period, and receives the message 516. As will be appreciated, in another embodiment, the slave 110 may be configured to send the request 516 after the beacon 514 without previously attempting to send a request message asynchronously.

In the next beacon 518 transmitted by the master device 110, the master device 110 allocates a time slot for data transfer to the slave device 120 and allocates a data transfer bit rate to the time slot. The slave device 120 then switches to a data transfer mode to listen at the allocated data transfer bit rate in the allocated time slot. In the allocated time slot, the master device 110 sends data 520 to the slave device 120 at the data transfer bit rate. In this example, the data transmission 520 also includes a data done indication, which tells the slave device 120 that the data transfer is complete. On receipt of the data done indication, the slave device 120 may revert to a messaging mode for subsequent operation at the messaging bit rate but in some embodiments and may instead enter a sleep mode. The data done indication may be sent as part of a packet that includes at least a final portion of the data or as a separate packet from the data.

Figure 6:
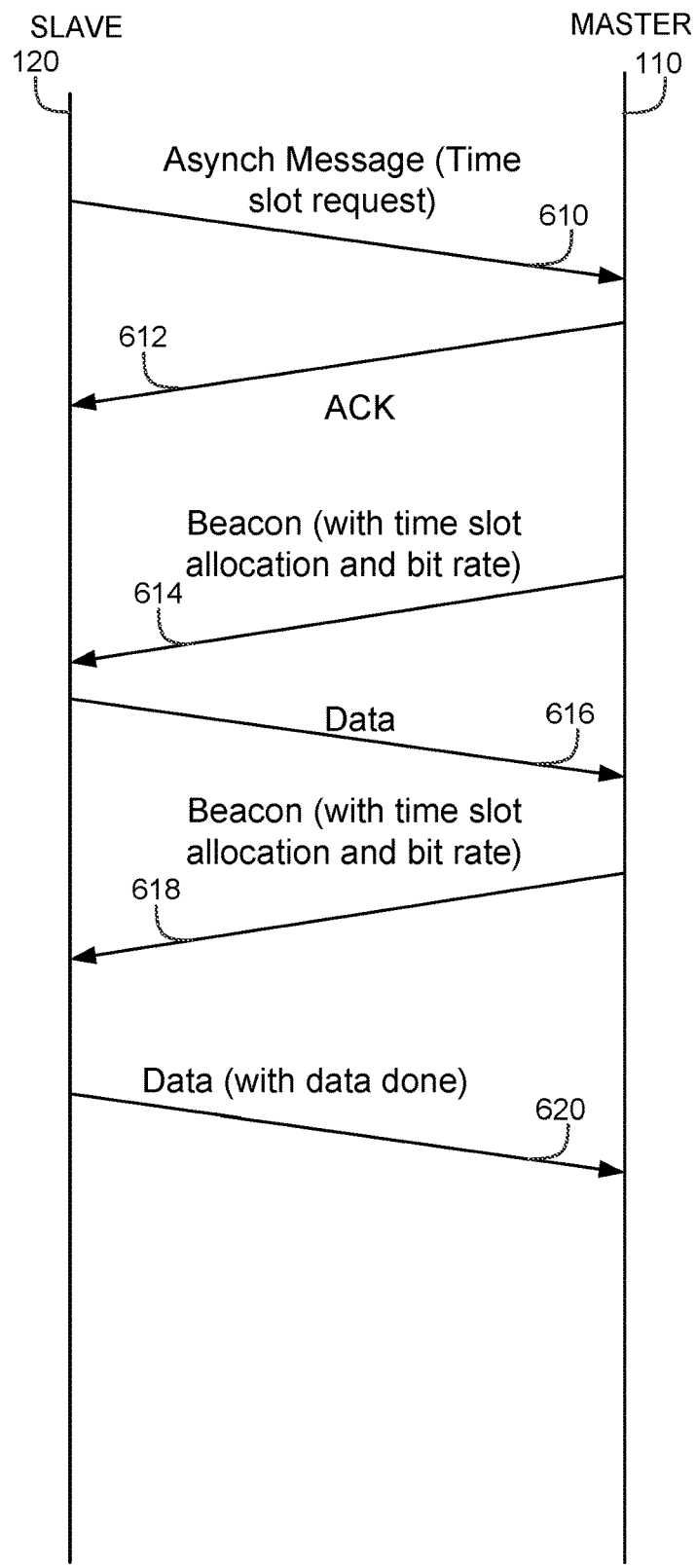
FIG. 6 is a swim lane diagram illustrating a data transfer from a slave device to a master device in accordance with an embodiment.

FIG. 6 depicts an example of data being transferred from the slave device 120 to the master device 110, in another embodiment.

The slave device 120 sends a message 610 to the master device 110 asynchronously using the messaging bit rate. The asynchronous message 610 comprises a request for data transfer. The asynchronous message 610 is received by the master device 110. The master device 110 transmits an acknowledgement, ACK 612, at a bit rate that is the same as the messaging bit rate. The slave device 120 receives the ACK 612.

The master device 110 transmits a beacon 614 at a bit rate that is the same as the messaging bit rate. The beacon 614 comprises an allocation of a first time slot for the slave device 120 to send data to the master device 110. The beacon 614 also comprises an indication of a data transfer bit rate to be used for the data transfer in the first time slot.

In the first time slot, the slave device 120 sends data 616 to the master device at the data transfer bit rate. The data 616 does not complete the data transfer requested by the slave device 120. In the example of FIG. 6, the master device 110 knows that the data transfer is not complete because the slave device 120 has not sent a data done indication.

In other embodiments, the slave device 120 may send an indication that there is still data remaining to be sent. The slave device 120 may transmit in its allocated time slot an indication that it has not finished the total payload. For example, it may transmit the indication in a final data packet that it transmits in that super frame. Based on the indication that the slave device 120 has not finished the total payload, the master device 110 knows to allocate further timeslots to that slave device 120 in the next super frame.

Returning to FIG. 6, master device 110 transmits a second beacon 618 at a bit rate that is the same as the messaging bit rate. The beacon 618 comprises an allocation of a second time slot for the slave device 120 to send data to the master device 110. The beacon 608 also comprises an indication of a data transfer bit rate to be used for the data transfer in the second time slot. The data transfer bit rate for the second time slot may be the same or different to the data transfer bit rate used for the first time slot.

In the second time slot, the slave device 120 sends data 620 to the master device 110 at the data transfer bit rate. The slave device 120 also sends a data done indication to say that the data transfer is complete. The data done indication is an indication that the payload is finished. If an indication is provided that the data is finished, the master device 110 will not allocate any time slots to that slave device 120 in the next super frame. An exception may be if the slave device 120 also transmitted another request during the latest CAP to transmit a further data payload.

In the example of FIG. 6, a data transfer is split across two time slots 420, 424 in different super frames. In other examples, data may be communicated over any suitable number of time slots and/or any suitable number of super frames. In some circumstances, the master device 110 may allocate multiple time slots in a single super frame to one slave device 120. Due to practical upper limits on the packet size, when transferring data, slave device 120 may send multiple packets within each time slot instead of a single packet.

In general, a data transfer that is indicated herein in a swim lane diagram by a single arrow may comprise multiple packets and/or multiple time slots within a single super frame.

The number of time slots allocated by the master device 110 for communication with a slave device 120 may be determined based on whether other slaves wish to communicate in the same super frame. The number of time slots allocated by the master device 110 may be determined based on the type of data to be communicated.

Figure 7:
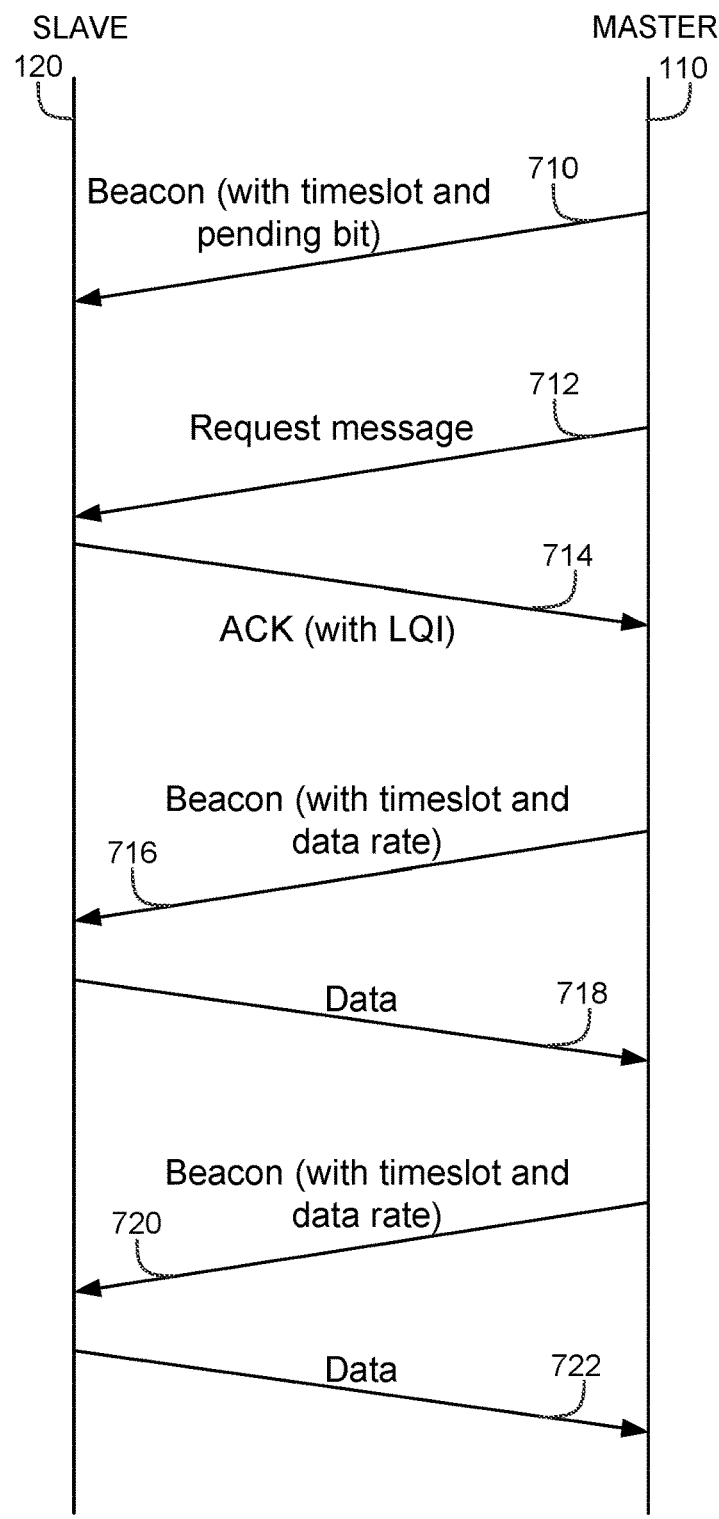
FIG. 7 is a swim lane diagram illustrating a data transfer from a slave device to a master device in accordance with an embodiment.

FIG. 7 shows a further example of data transfer from the slave device 120 to the master device 110.

The master device 110 sends a beacon 710 at a bit rate that is the same as the messaging bit rate. The beacon 710 includes a time slot allocation and a pending field (e.g. a bit) that is set to indicate that further communication is pending. On receiving the pending field, the slave device 120 responds by listening for messages during the time slot allocation within that super frame, instead of going into a sleep mode. In other embodiments, any suitable method may be used by the master device 110 to wake the slave device 120.

At the allocated time slot, the master device 110 sends a request message 712 at the messaging bit rate. The request message 712 may define a data type, for example video, audio or software. In some circumstances, the question of whether the communication is for information from the slave or for information to be sent to the slave may be intrinsic to the data type. For example, a software update may always be sent from the master device 110 to the slave device 120. In other circumstances, the message request may specify whether the communication is for information from the slave or for information to be sent to the slave.

The slave device 120 receives the message request 712. In the present embodiment, the slave device 120 determines a value for a Link Quality Indicator (LQI) using the message request 712. The LQI is largely based on a signal to noise ratio (SNR) determined for a received signal. In the exemplary embodiments described herein, it is assumed that the LQI is symmetric, so the LQI for a transmission from the master device 110 to the slave device 120 is taken to be the same as the LQI for a transmission from the slave device 120 to the master device 110.

In response to the message request 712, the slave device 120 sends an ACK 714 at a bit rate that is the same as the messaging bit rate. The ACK 714 includes the determined value for the LQI.

The master device 110 receives the ACK 714 including the determined value for the LQI. The master device 110 determines a data transfer bit rate based on the determined value for the LQI. For example, the master device 110 may select a higher data transfer bit rate for higher quality links, and a lower data transfer bit rate for lower quality links, as defined by the LQI.

The data transfer bit rate may be selected from a plurality of bit rates. For example, the data transfer bit rates may, for example, include 512 Kbit/s, 256 Kbit/s, 128 Kbit/s and 64 Kbit/s. The data transfer bit rates may also include a bit rate matching the messaging bit rate, and/or one or more bit rates lower than the messaging bit rate. If the LQI indicates a good quality of transmission, the master device 110 may select the maximum available bit rate. Otherwise, the master device 110 may select the maximum possible bit rate that is likely to provide an accurate and/or efficient data transfer, given the LQI. Thus, the master device 110 may select a maximum bit rate amongst a plurality of predefined bit rates for a determined present link quality and/or noise level.

At a start of a next super frame, the master device 110 transmits a beacon 716 including an allocation of a time slot for data transfer from the slave device 120. The beacon 716 also includes an indication of the determined data transfer bit rate.

At the allocated time slot, the master device 110 listens at the determined data transfer bit rate. The slave device 120 transmits data 718 at the determined data transfer bit rate in the allocated time slot.

In the example of FIG. 7, the data transfer is not completed by the first transmission of data 718. At a start of a next super frame, the master device 110 transmits a further beacon 720 including an allocation of a time slot and an indication of a data transfer bit rate for that time slot. In some cases, the data transfer bit rate for a next time slot may be different from the data transfer bit rate used for a previous time slot. The bit rate for the second time slot, as defined in beacon 720, may be based on an LQI determined based on the signal that carried data 718.

At the time slot allocated in beacon 720, the master device 110 listens at the data transfer bit rate indicated in beacon 720. The slave device 120 transmits data 722 at the data transfer bit rate indicated in beacon 720 in the allocated time slot.

In the embodiment of FIG. 7, the slave device 120 determines the LQI by a measurement of the message request 712 received and informs the master device 110 of the LQI in the ACK 714 to the master device 110. In other embodiments, the master device 110 may determine the LQI by a measurement associated with the ACK 714 as received by the master device 110.

In further embodiments, a value for any signal parameter of the message request 712 or of the ACK 714 or of a further message between the master device 110 and slave device 120 may be used in determining a data transfer bit rate. For example, the signal parameter may be signal to noise ratio (SNR).

The message request 712 and the ACK 714 may be considered to be a handshake at a fixed (e.g. relatively low) bit rate that happens prior to the transmission of data. A handshake at a lower bit rate may therefore be used to communicate data at a higher bit rate.

The slave device 120 may also request a data transfer, for example as illustrated in FIGS. 4 to 6. Where the slave device 120 requests communication with the master device 110, a request is transmitted from the slave device 120. The master device 110 may determine the value for the LQI based on the request received from the slave device 120. The master device 110 may determine a data transfer bit rate for the requested transfer, where the determining of the data transfer bit rate is based on the determined value for the LQI. In such cases, the request from the slave device 120 is again part of a handshake at the lower bit rate that is used in order to communicate data at the higher bit rate.

In some embodiments, the master device 110 may select different bit rates for communication to different slave devices 120, based on different values for LQI being obtained for communication with the different slave devices 120.

Figure 8:
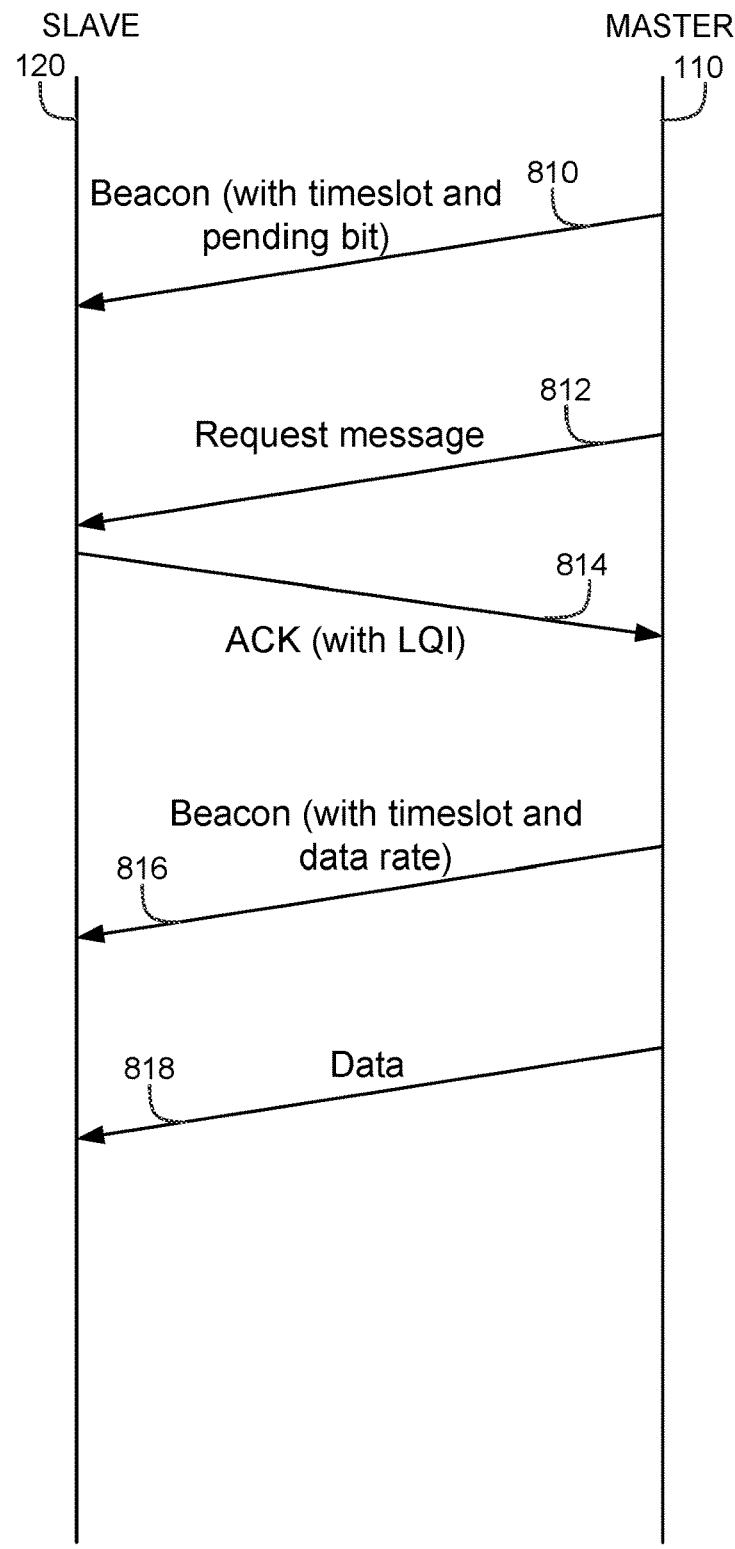
FIG. 8 is a swim lane diagram illustrating a data transfer from a master device to a slave device in accordance with an embodiment.

We turn to FIG. 8 which shows a further example of a request for data transfer by the master device 110.

The master device 110 sends a beacon 810 at a bit rate that is the same as the messaging bit rate. The beacon 810 includes a time slot allocation and a set pending field (e.g. a pending bit). The pending field indicates that further communication is pending, as has been previously described herein.

At the allocated time slot, the master device 110 sends a request message 812 at the messaging bit rate. The slave device 120 receives the request message 812 and determines a value for an LQI based on the request message 812. The slave device 120 transmits an ACK 814 at the messaging bit rate. The ACK 814 includes the determined value for the LQI.

The master device 110 receives the ACK 814 and determines a data transfer bit rate based on the determined value for the LQI.

At a start of a next super frame, the master device 110 sends a beacon 816. The beacon 816 includes an allocation of a time slot and an indication of the determined data transfer bit rate.

At the allocated time slot, the slave device 120 listens at the data transfer bit rate. The master device 110 transmits data 818 at the data transfer bit rate, which is received by the slave device 120.

Using the method described above with reference to FIGS. 2 to 8, data is communicated at a selectable bit rate. The data may comprise, for example, an audio or video recording from a peripheral device to a control panel, or a software update from the control panel to the peripheral device. In embodiments described above, messages are at a fixed bit rate. To switch to the selectable bit rate, a handshake is used between the master device 110 and the slave device 120 with which the data is to be communicated.

The selectable bit rate is usually higher than the messaging bit rate. However, in some situations, the selectable bit rate may be selected to be the same or lower than the messaging bit rate. For example, one may consider a situation in a very noisy environment, where it is considered very important for the data to be communicated accurately. A very low bit rate may be used for the data communication, even if it means that the data will take a long time to be communicated.

In a more usual scenario, communicating the data at a high bit rate may be advantageous since the data is relatively large. A high bit rate potentially communicates the data significantly faster than would otherwise be achievable. The data transmission occupies the transmission medium (in this case, air) for less time. By dynamically selecting the bit rate based on a link quality and/or noise level, data may be transmitted at as high a rate as possible.

In these examples, beacons and CAP messages are transmitted at a fixed bit rate, which may be the messaging bit rate. Maintaining a fixed bit rate for beacons which is the same as the messaging bit rate minimizes system complexity. In a system with a master device 110 and a plurality of slave devices 120, it would be complicated to vary a bit rate used for beacons as the bit rate of all the slave devices 120 would have to change.

Data communication is based on a synchronous protocol, with a master device 110 that controls one or more slave devices 120. A bit rate for data communication may be specific to the slave device 120 involved in communicating the data.

When a time slot is allocated for a certain communication, both the master device 110 and the relevant slave device 120 are pre-configured to operate at the relevant bit rate. Each device defaults back to the messaging bit rate for receiving messages, although the slave may revert to sleep before listening at the messaging bit rate for the next beacon. In general, data is not sent as often as messages. When configured for a certain bit rate, not only does the transmitting device transmit at that bit rate, but the receiving device also listens at that bit rate.

Using a single transceiver to transmit messages and data may reduce the cost and complexity of each device when compared with a device that uses different transceivers and different protocols. Using a single front end and/or antenna may further reduce cost and complexity.

Whilst the foregoing description has described exemplary embodiments, it will be understood by those skilled in the art that many variations of the embodiments can be made within the scope of the present invention as defined by the claims.

What is claimed is:

1. A master device configured for communication with at least one slave device, the master device comprising processing circuitry that includes a transceiver, the processing circuitry configured to operate the transceiver at a bit rate selected from a group comprising:
   a messaging bit rate for message communications and a data transfer bit rate for data communications, wherein data communications are larger communications than message communications, and wherein the messaging bit rate is a fixed bit rate and the processing circuitry is configured to operate at the messaging bit rate when no data transfer is scheduled;
   wherein the processing circuitry is configured to:
   operate the transceiver at the messaging bit rate for communication of messages;
   in response to being triggered for a data transfer, select at least one time slot in which to perform the data transfer, and operate the transceiver to transmit to a first slave device an instruction to operate at a data transfer bit rate in the selected at least one time slot, the data transfer rate being different to the messaging bit rate or selected from a plurality of predefined data transfer bit rates;
   operate at the data transfer bit rate in the selected at least one time slot to perform the data transfer with the first slave device in response to being triggered for a further data transfer with a second slave device, the further at least one time slot being different to said at least one time slot:
   select a further at least one time slot in which to perform the further data transfer, select a further bit rate for the further data transfer, and operate the transceiver to transmit to the second slave device an instruction to operate at the further bit rate in the further at least one time slot;
   and operate at the further bit rate in the further at least one time slot to perform the further data transfer.

2. The device according to claim 1, wherein the further bit rate for data transfer to the second slave device is different from the bit rate for data transfer to the first slave device.

3. The device according to claim 1, wherein the triggering for the data transfer comprises either:
   receiving by the processing circuitry a request from the first slave device for a data transfer with the master device;
   or receiving by the processing circuitry an acknowledgement from the first slave device in response to a request by the master device for a data transfer with the first slave device,
   wherein the request to transfer data comprises an indication of a data type of the data to be transferred, and wherein the data transfer bit rate is selected in dependence on the data type being one of a set of predetermined data types, wherein the set of predetermined data types comprises at least one of audio data, video data or software update.

4. The device according to claim 1, wherein the processing circuitry is configured to select the data transfer bit rate in dependence on at least one signal parameter of a message received from or by the first slave device.

5. The device according to claim 4, wherein the processing circuitry is configured to perform a handshaking procedure with the first slave device, thereby to obtain a value for the at least one signal parameter.

6. The device according to claim 1, wherein the data transfer bit rate is higher than the messaging bit rate.

7. The device according to claim 1, wherein the data transfer request or the instruction to the first slave device are transmitted and received using the messaging bit rate.

8. The device according to claim 1, wherein beacons are transmitted, with a regular periodicity, from the master device to the at least one slave device, wherein the data transfer is by synchronous communication based on the beacons.

9. The device according to claim 1, wherein the instruction to the first slave device is transmitted as part of a beacon.

10. The device according to claim 1, further comprising a single front end or single antenna configured for both the communication of messages and the data transfer.

11. The device according to claim 1, wherein in response to being triggered for a data transfer the processing circuitry is configured to select the data transfer bit rate from a predefined plurality of bit rates.

12. The device according to claim 1, wherein communications having payloads that are communicated over multiple time slots or multiple packets are data communications, and message communications are transmitted in a single packet.

13. The device of claim 1, wherein the message communication occurs between beacons.

14. A system comprising a master device and at least one slave device, each of the devices comprising respective processing circuitry that includes a respective transceiver, the processing circuitry configured to operate the transceiver at a bit rate selected from a group comprising:
   a messaging bit rate and a data transfer bit rate, wherein the messaging bit rate is a fixed bit rate and the processing circuitry is configured to operate at the messaging bit rate when no data transfer is scheduled;
   wherein the processing circuitry of each device is configured to operate the respective transceiver at the messaging bit rate for communication of messages;
   wherein the processing circuitry of the master device is configured to, in response to being triggered for a data transfer, select at least one time slot in which to perform the data transfer, select a data transfer bit rate for the data transfer, and operate the transceiver to transmit to a said slave device an instruction to operate at the selected data transfer bit rate in the selected at least one time slot;
   operate at the selected data transfer bit rate in the selected at least one time slot to perform a data transfer;
   in response to being triggered for a further data transfer with a second slave device, a further at least one time slot being different to said at least one time slot:
   select the further at least one time slot in which to perform the further data transfer, select a further bit rate for the further data transfer, and operate the transceiver to transmit to the second slave device an instruction to operate at the further bit rate in the further at least one time slot;

and operate at the further bit rate in the further at least one time slot to perform the further data transfer;

and wherein the processing circuitry of the said slave device is configured to receive from the master device the instruction to operate the transceiver at the selected data transfer bit rate in the selected at least one time slot;

and operate at the selected data transfer bit rate in the selected at least one time slot to perform the data transfer.

15. A method comprising:

operating processing circuitry of a master device at a messaging bit rate for communication of messages, wherein the processing circuitry includes a transceiver, and the processing circuitry is configured to operate the transceiver at a bit rate selected from a group comprising:

a messaging bit rate and a data transfer bit rate, wherein the messaging bit rate is a fixed bit rate and the processing circuitry is configured to operate at the messaging bit rate when no data transfer is scheduled;

operating a transceiver of a slave device at the messaging bit rate for communication of messages, wherein the processing circuitry includes the transceiver and is configured to operate the transceiver at a bit rate selected from a group comprising:

a messaging bit rate and a data transfer bit rate;

in response to being triggered for a data transfer, selecting by the processing circuitry of the master device at least one time slot in which to perform the data transfer, selecting by the processing circuitry of the master device a data transfer bit rate for the data transfer, and operating the transceiver of the master device to transmit to a first slave device an instruction to operate at the selected data transfer bit rate in the selected at least one time slot;

in response to being triggered for a further data transfer with a second slave device, a further at least one time slot being different to said at least one time slot:

selecting the further at least one time slot in which to perform the further data transfer, selecting a further bit rate for the further data transfer, and operating the transceiver to transmit to the second slave device an instruction to operate at the further bit rate in the further at least one time slot, and operating at the further bit rate in the further at least one time slot to perform the further data transfer receiving, by the processing circuitry of the slave device the instruction;

and operating the processing circuitry of the master device and the processing circuitry of the slave device at the selected data transfer bit rate in the selected at least one time slot to perform the data transfer.

* * * * *